United States Patent [19]
Johnson et al.

[11] 3,926,079
[45] Dec. 16, 1975

[54] MACHINE TOOLS

[75] Inventors: Reginald Francis Johnson, Leicester; Thomas James Potts, Derby; Gordon Bridgman Jennings, Nottingham, all of England

[73] Assignee: Rolls-Royce (1971) Limited, London, England

[22] Filed: Mar. 18, 1975

[21] Appl. No.: 559,426

[30] Foreign Application Priority Data
Mar. 22, 1974 United Kingdom............ 12852/74

[52] U.S. Cl................................................ 82/36 A
[51] Int. Cl.².......................................... B23B 29/00
[58] Field of Search..................................... 82/36 A

[56] References Cited
UNITED STATES PATENTS

| | | | |
|---|---|---|---|
| 2,473,138 | 6/1949 | Darash............................ | 82/36 A X |
| 3,054,333 | 9/1962 | Braindrj et al.................. | 82/36 A X |
| 3,137,916 | 6/1964 | Leafquist et al................. | 82/36 A X |
| 3,375,742 | 4/1968 | Strum................................ | 82/36 A |

Primary Examiner—Harrison L. Hinson
Attorney, Agent, or Firm—Cushman, Darby & Cushman

[57] ABSTRACT

A machine tool for heating and cutting a workpiece, the machine tool having a rotatable manifold attached to its saddle. The rotatable manifold receives service fluids from suitable sources of supply and delivers them to heating torches which are placed adjacent responsive cutting tools.

9 Claims, 6 Drawing Figures

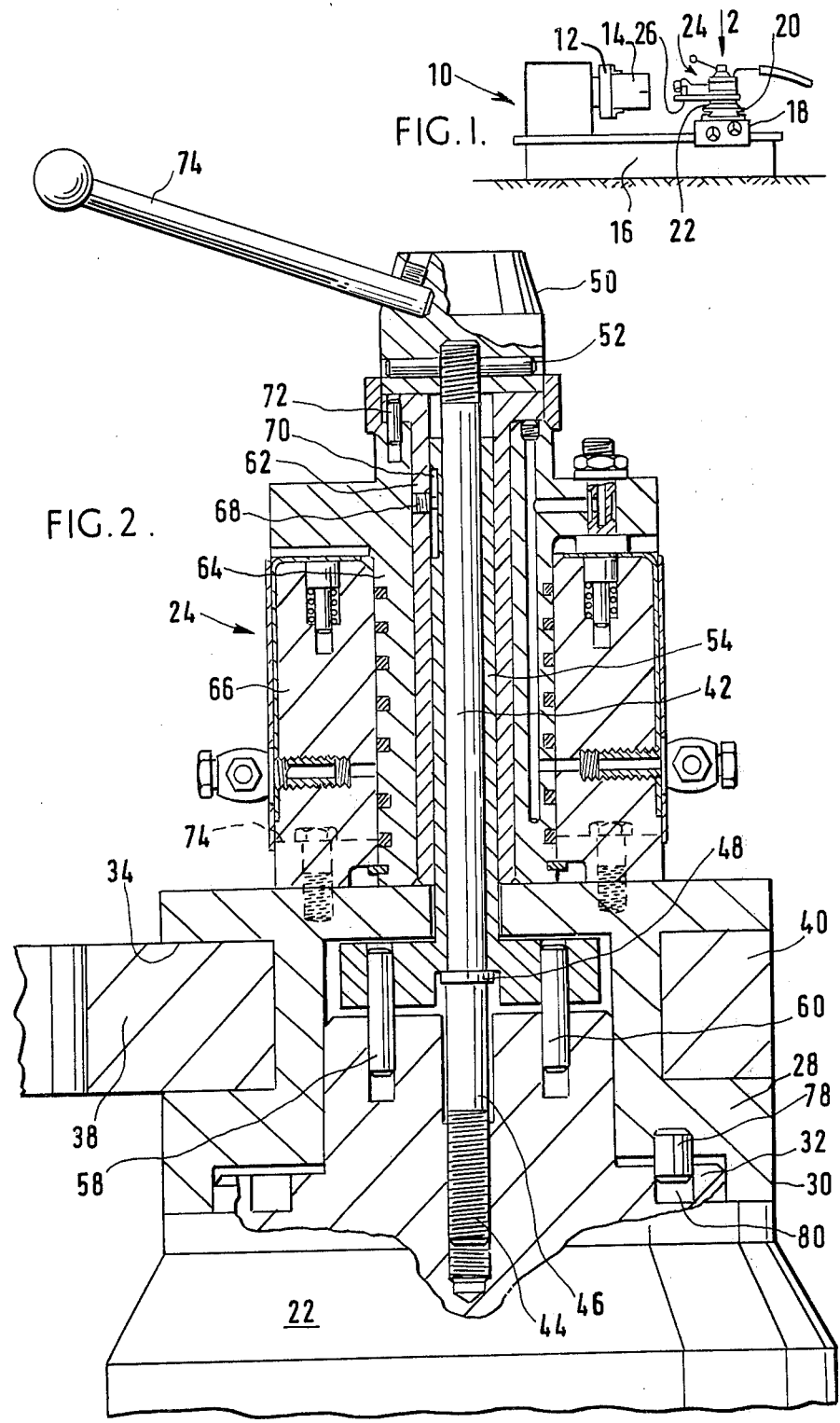

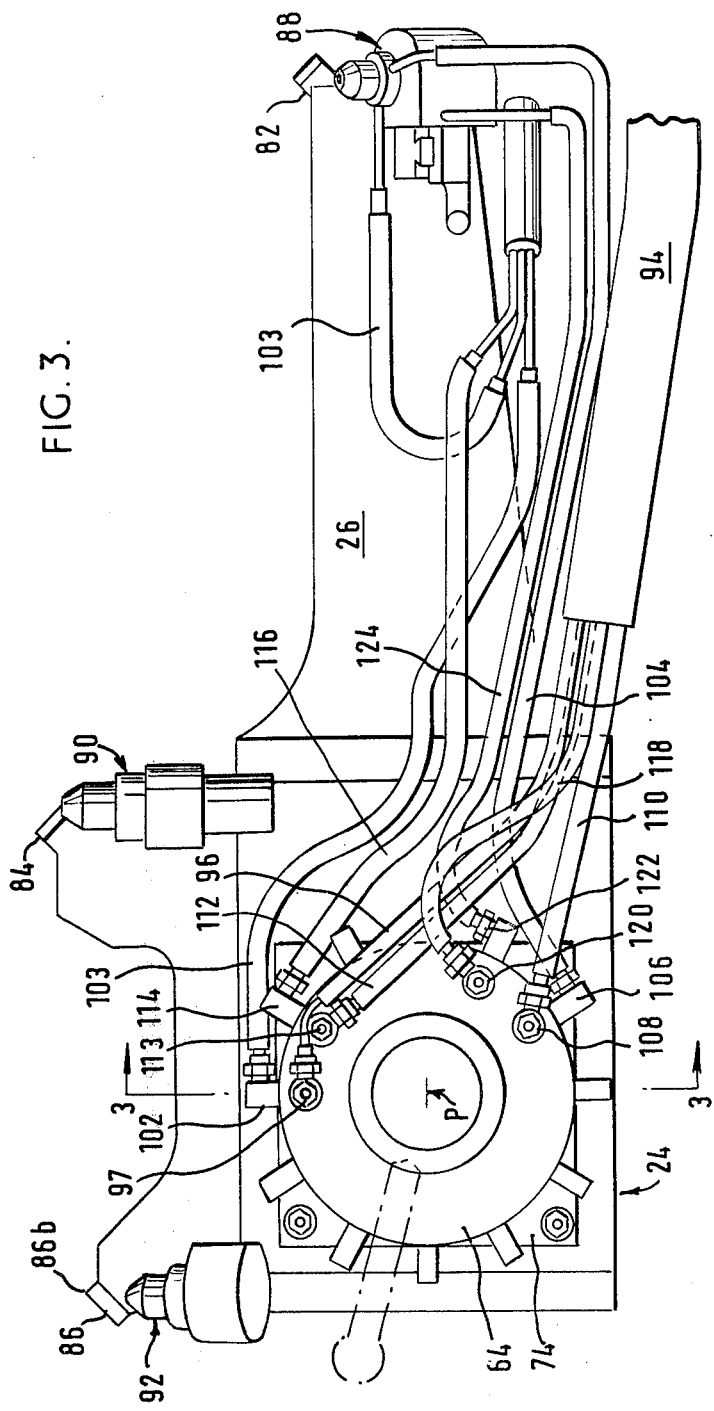

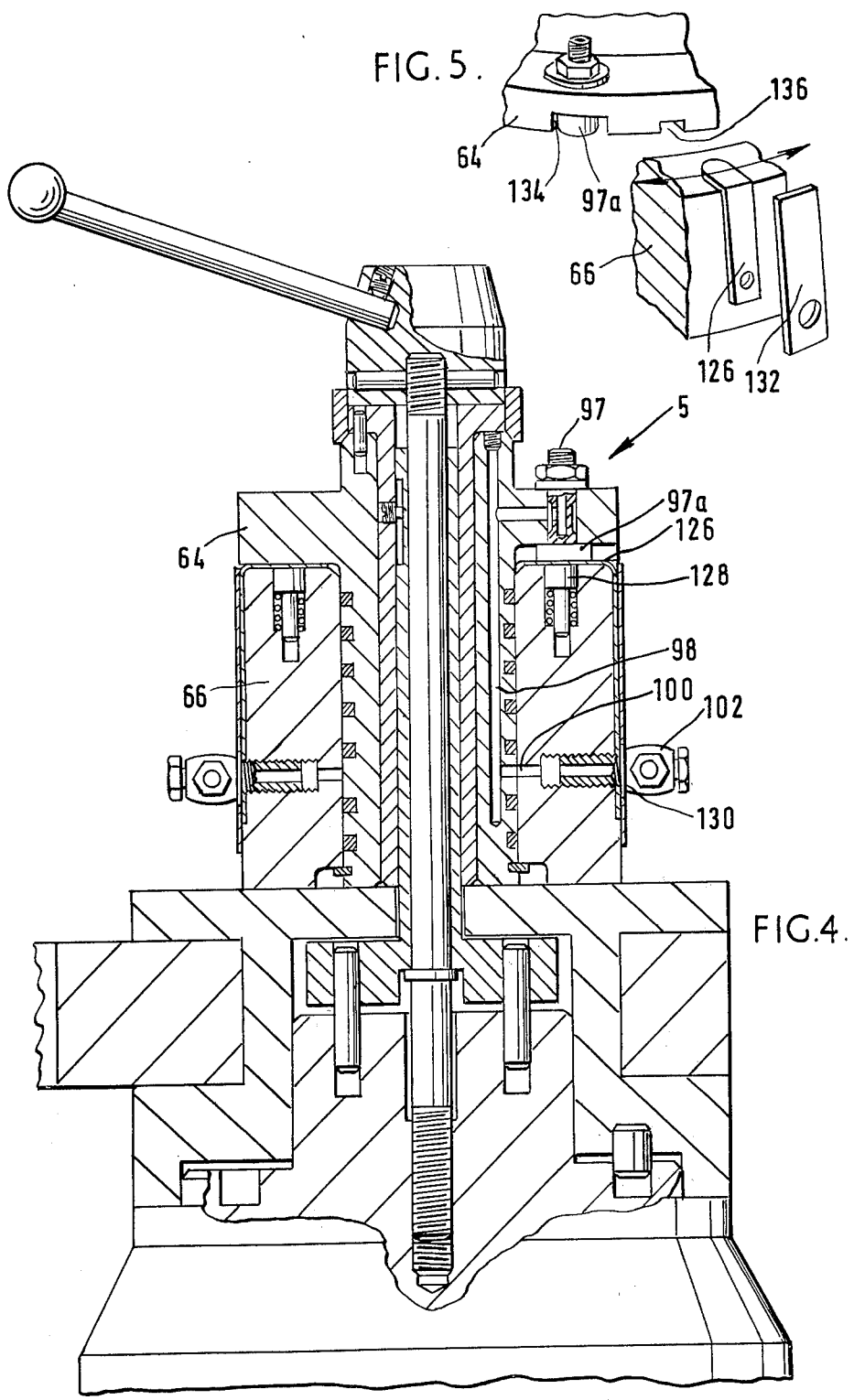

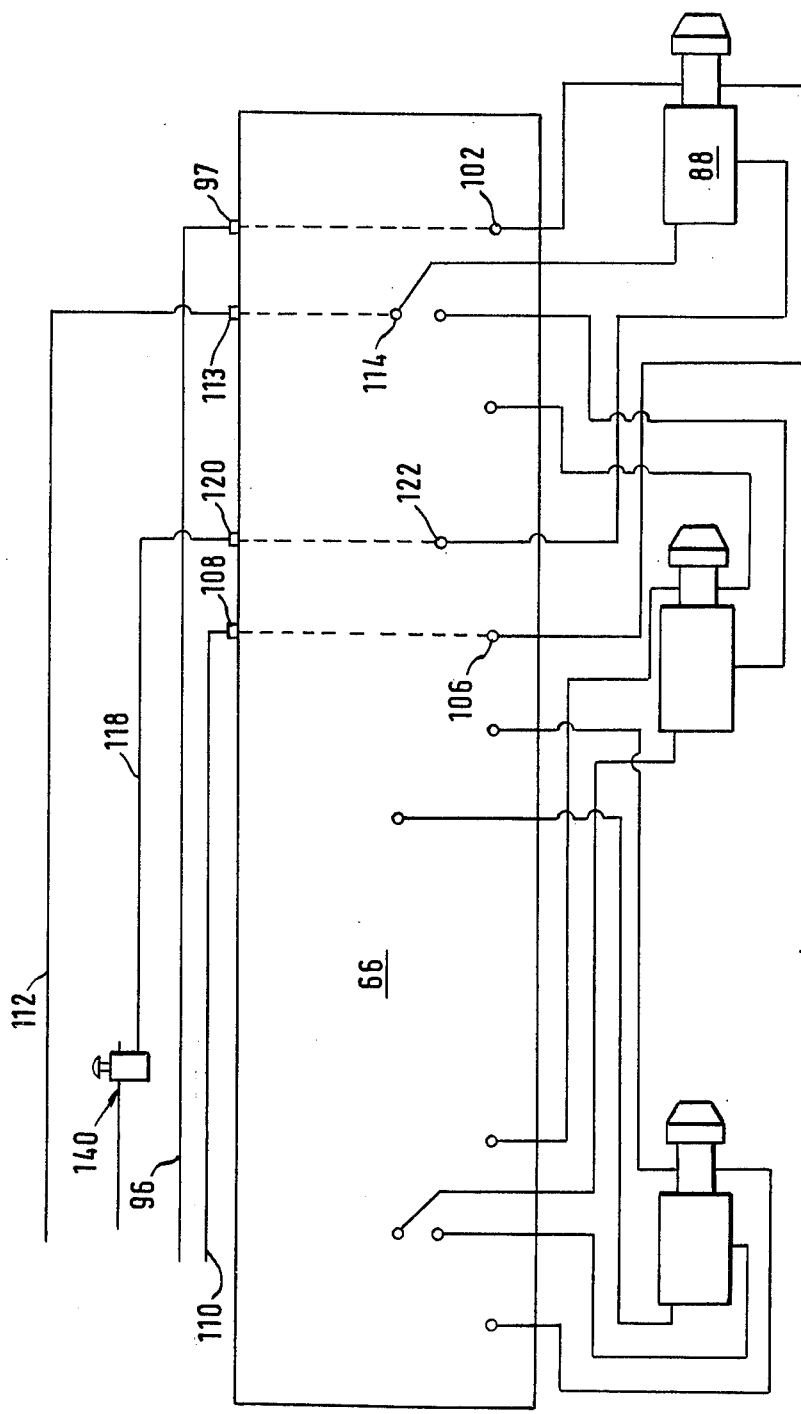

MACHINE TOOLS

This invention concerns machine tools.

Machine tools which are utilised for the turning, facing and boring of metal workpieces are well known in the art. Such a machine tool has a rotary work holder and a bed or base upon which is supported, a saddle which traverses the bed or base and in turn, supports a turret which carries a multiplicity of cutting tools, all of which are arranged in the turret, so as to be usable in a desired order, to cut a workpiece being rotated by the work holder.

Alloys of metals have now been concocted which have characteristics such as to make them extremely difficult to machine by known cutting tools per se, consequently machining techniques have had to be developed to overcome these difficulties and one method which has proved successful in experimental level, is the pre-heating of a metal to condition it, at a place on the workpiece immediately before that place comes into contact with a cutter. Various types of heating apparatus have been tried, including electrical heating, gas torches and plasma arc guns and the latter was found most suitable from the points of view of handling bulk, heat obtainable and control of the workpiece volume to be thereby heated. However, as stated hereinbefore, those facts were established at experimental level only, and the problem arose as to how to utilise such apparatus on a commercial scale and still retain all the advantages gained experimentally.

Thus it is an object of the present invention to provide a machine tool which includes workpiece heating apparatus as well as cutting apparatus all arranged with respect to each other such that more than one combined heating and cutting operation can be sequentially performed on a workpiece without the removal from, or addition to the machine tool, of heating or cuting apparatus between respective operations. Consequently the present invention comprises a turret adapted for traversable and rotatable mounting on a machine tool saddle, wherein said turret comprises an assembly of a rotatable base adapted for the rigid holding of a plurality of cutting tools and surmounted by a pair of relatively rotatable, electrically non-conductive sleeves arranged coaxially one within the other about a common axis of rotation which is normal to said base and sleeve retaining means, one of said sleeves having connections and passages for the receipt and passage therethrough of respective flows of water, gas, air and electricity and the other of said sleeves having means for receiving said flows and re-directing them to positions adjacent a respective one of the cutting tools positions on said rotatable base, at each of which adjacent positions in operation, there will be a transferred arc plasma gun.

Preferably said means for receiving the flows of water, gas and air and re-directing them comprises further passages and connections and the means for receiving and re-directing said electricity comprises electrically conductive means externally of said other electrically non-conductive cylindrical sleeve.

Said pair of relatively rotatable, electrically non-conductive sleeves comprise a sub-assembly coaxially mounted upon a sleeved metal spindle, one end of which is screwed into the saddle structure and in operation is rotated to unlockably lock the turret to the saddle to prevent relative rotation therebetween and maintain the full assembly thereof rigid.

The invention will now be described by way of example only, and with reference to the accompanying drawings in which:

FIG. 1 is a diagrammatic view of a machine tool in accordance with the invention, FIG. 2 is a view on line 2—2 of FIG. 3, FIG. 3 is a view in the direction of arrow 2 in FIG. 1, FIG. 4 is a repeat view of FIG. 2, FIG. 5 is an exploded part view of the turret in FIG. 3, and FIG. 6 is a fluid and electricity flow circuit diagram.

In FIG. 1 a machine tool is indicated by the numeral 10. The machine tool is a lathe having a rotary work head or chuck 12 by means of which a workpiece 14 is gripped and rotated in known manner. The workhead 12 is supported on a long bed 16 and the bed also carries a saddle 18, which can be slid towards or away from the work head as desired, again in known manner.

Saddle 18 has a smaller, sliding platform 20 mounted on its upper surface, which is slidable across saddle 18 in a direction normal to the direction of sliding of saddle 18 on bed 16 and the assembly as a whole, is known as a compound slide. Platform 20 is crowned by a frusto-conical boss 22 which in turn carries a rotatable turret structure 24.

Turret structure 24 rigidly supports cutting tools either directly or via e.g. boring bars, such as the boring bar 26 in FIG. 1 and further aspects of the structure will now be described with reference to FIG. 2.

Turret structure 24 comprises a rectangular base member 28 with a flange 30 formed on its underside. Flange 30 fits a spigot 32 on the crown of frusto-conical portion 22 of platform 20.

Base member 28 has straight recesses 34 with rectangular cross-sections, around its periphery for the receipt of cutting tool holders, one of which is numbered 38 and another is numbered 40. The tool holders are rigidly fixed in their respective recesses by set screws (not shown) in known manner.

A metal spindle 42 has a coarse pitch acme or buttress thread 44 formed on one end and is screwed into a hole 46 having a similarly formed thread which hole passes vertically through the centre of frusto-conical portion 22. Spindle 42 has a flange 48 near that end with acme or buttress thread 44 and at the other end remote therefrom, has an ordinary "vee" thread of relatively fine pitch formed thereon, by means of which, it is screwed into an end cap 50 and locked thereto by a pin 52 so as to prevent relative rotation between spindle and end cap.

A metal flanged sleeve 54 is fitted over spindle 42 and a recessed shoulder in the flanged end thereof rests against the flange 48 of spindle 42. A pair of dowel pins 58,60 are tightly fitted into the flange of the flanged sleeve 54 and their protruding lower ends are made a sliding fit in the upper face of frusto-conical portion 22. Thus spindle 42 is rotatable relative to flanged sleeve 54.

A further sub-assembly of sleeves are provided, comprising a metal, inner (with respect to the sub-assembly) flanged sleeve 62, an intermediate sleeve 64 made from an electrically non-conductive material known by the trademark "TUFNOL" and an outer sleeve 66 also made from TUFNOL. The inner sleeve 62 is prevented from rotating relative to flanged sleeve 54 by a grub screw 68 which projects from inner sleeve 62 into a slot 70 in sleeve 54. The arrangement is such that relative axial movement between the two sleeves is possible. Intermediate sleeve 64 is dowelled at 72, to inner sleeve 62, thus preventing relative rotation therebetween. However, outer sleeve 66 is a sliding fit on intermediate sleeve 64 and is bolted at its lower end, via square flanges 74 shown in dotted lines in FIG. 2 to the turret base member 28.

In order to rotate base member so as to remove one tool from the vicinity of the workpiece and bring the next adjacent tool thereto, end cap 50 is rotated by pressure on handle 74 in a direction which causes spindle 42 to screw upwards, whereupon its flange 48 lifts flanged sleeve 54 until the upper surface thereof registers with base member 28 and in turn, lifts the base member.

Rotation of spindle 42 is continued until index dowel 78 is force fitted into base member 28, is lifted clear of hole 80. Preferably, screw thread 44 is of sufficiently coarse pitch to achieve this by one complete rotation of spindle 42. At this point, base member 28 along with tool holders 38,40 and outer sleeve 66 can be rotated until index dowel 78 is aligned with the next index hole (not shown) whereupon spindle 42 is rotated in the opposite direction until end cap 50 via inner sleeve 62, clamps the turret structure firmly onto saddle 22.

In view of the fact that intermediate sleeve 64 and outer sleeve 66 are made from TUFNOL (Trademark) it is important to ensure that no undue compressive loads are transmitted to them via the flange of intermediate sleeve 62 during the clamping action and this is achieved by appropriate dimensioning of the respective parts.

The machine tool of the example is provided with three cutting tools (FIG. 3) which are numbered 82, 84 and 86 respectively, each tool has a respective plasma arc gun 88, 90 and 92 mounted adjacent thereto. Each plasma arc gun is of the type known as the "transferred arc" type of plasma gun, which per se is well known in the art and so will not be described in detail. Cutting tool 86 is used for turning the outside diameter of a workpiece and in operation, turret 24 would be traversed to the left as viewed in FIG. 3 so as to achieve this. The outlet nozzle of the plasma arc gun 92 is aligned in a plane which contains the corner 86b which will be in contact with the workpiece during the operation. Similarly plasma arc guns 88 and 90 are aligned in planes which contain those parts of their respective tools 82,84 which will come into contact with the workpiece during boring and facing operations for which these respective tools are provided. It will be appreciated that as each tool is required to be used, turret 24 will have to be rotated about axis P (FIG. 3) through an angle of 90° (in the present example).

FIG. 2 has been utilised to describe the construction of turret 24 on saddle 22. FIG. 4 which pictorially is identical with FIG. 2, will now be used, in conjunction with FIG. 3 to aid description of the water, air, electricity and argon gas supplies connections between the respective supply sources and respective guns, via turret 24.

A loom of tubes 94 (FIG. 3) is connected between the aforementioned supply sources and turret 24. At a place adjacent the turret, the tubes are separated from each other and one tube 96 which carries water for the purpose of cooling of gun 88, is connected at 97 on the upper surface of the flange of sleeve 64, where the water passes via a vertical passage 98 (FIG. 4) to a horizontal connecting passage 100 in sleeve 66, from which the water passes, via a banjo bolt connection 102 in the side of sleeve 66 and a tube 103, to gun 88 (FIG. 3). The cooling water returns to supply source via a tube 104, connections 106,108 in sleeve 66 and the flange of sleeve 64 respectively and tube 110.

Argon flows from source (not shown) via the loom and tube 112, connection 113, passages (not shown) in sleeves 64 and 66, outlet connection 114 and tube 116, from where it passes to the gun 88 to be ionised and discharged in the normal operational manner.

Air flows from source (not shown) via tube 118, inlet connection 120, outlet connection 122 and tube 124 to the pneumatic mechanism (not shown) fitted to gun 88 and which is described in our co-pending British Patent application No. 10162/74.

The ability of water to conduct electricity has been taken advantage of, by way of connecting the electricity supply to the gun electrode (not shown) via the flow of water in tubes 97 and 103. However, at that part of the flow path from connection 97 to connection 102, the flow of electricity is diverted via an electrically conductive inverted "L" shaped plate 126. The "foot" of the plate is urged against the underside 97a of connection 97 by a spring loaded piston 128, located in sleeve 66, so as to make good electrical contact therewith and the current, having passed down the "shank" of the plate 126, rejoins the water flow via connection 102 which has an electrically conductive flange 130 pressing against the plate shank. The re-combined flow of water and electricity then flow to gun 88.

Prior to placing of tool 82 and gun 88 adjacent a workpiece to be bored, the electricity, if switched on, will also return via the water return tube 110, but when tool and gun are positioned against the workpiece, ready for operation, the current will transfer from the gun electrode (not shown) to the workpiece and heat it in known manner. Thus, during operation, the water return flow is devoid of electricity.

In FIG. 5, inverted L-shaped plate is shown in position on sleeve 66 and an insulation layer 132, also shown in FIGS. 2 and 4, adjacent thereto. The flange of sleeve 64 is also shown carrying the connection 97 with its head 97a in a radial slot 134 in the underside of the flange. A further slot 136 is also shown and its purpose is to provide a break in the continuity of the flange so that, in the event of the flange underside picking up conductive material from inverted L-shaped plate 126 during relative rotation between sleeves 64,66 there will be no danger of a completely circular track of conductive material forming on flange 64. The slot 136 should be narrow enough to prevent plate 126 from being urged into it when passing. As this means the plate will, at one instant, provide a temporary bridge, at least two such slots 136 are required, preferably widely spaced apart.

A plurality of sealing rings 140 are fitted to sleeve 64 so as to prevent leakage of the various substances as they flow through the sleeves. Also, in order to ensure that, if leakage occurs, it does so in a manner which will prevent either the argon or air from mixing with the water, the argon inlet and outlets (not shown) are placed highest on the sleeves, the air inlet and outlet are centrally placed and the water inlets and outlet, apart from connection 97, are placed lowest, thus taking into account the relative weights of the substances.

Only the full flow of substances from source, through turret 24 to gun 88 has been described, but guns 90 and 92 receive their own flows from the same source, that is, the same supply source (not shown) via tubes 96, 112 and 118 and the water/electricity mixture also leave turret 24 via tube 110. However, each gun 90,92 has its own set of tubes (not shown in FIG. 3 for reasons of clarity) which, on rotation of turret 24, that is base member 28 and sleeve 66, are connected to respective connections 97, 108, 113 and 120, so that on selecting a tool to perform a particular operation and positioning the turret to (a) bring the required tool against the workpiece and (b) connect the tubes of the appropriate gun to connections 97, 108, 113 and 120, firstly the workpiece can be rotated, the water may be switched in, then the electricity and then the argon and, on striking an arc between gun and workpiece so as to heat the workpiece, machining of the workpiece can commence.

In FIG. 6, sleeve 66 is schematically laid out in developed form and the respective fluid inlets and outlets for gun 88 are appropriately numbered. It should be noted that all the argon inlets to the respective guns are in a common horizontal plane, as are water inlets and outlets and air inlets.

Air valve 140 is as described in our co-pending British Patent application No. 10162/74.

The water and electrical connecting points are encased in a mouldable non electrically conductive plastic substance (not shown) and finally, prior to operation of the machine, a transparent plastic box structure (not shown) is fitted over the turret to provide further operation protection.

It will be apparent from the foregoing description, that with only a minor modification to the turret assembly, comprising the substitution of simple tubes (not shown) for the gas air and water looms from the sleeve 66 to respective tool positions, and appropriate change in fluid supply, such substances as cooling or lubricating oil can be fed to respective tool positions from a common supply, via the turret assembly. In such circumstances the electrical connection strip would be superfluous and will remain unused or alternatively, can be removed from the turret. However, the function of the turret will be unchanged in that it receives service fluid from a common supply and passes them to a number of positions as required.

What we claim is:

1. A turret adapted for traversable and rotatable mounting on a machine tool saddle, wherein said turret comprises an assembly of a rotatable base adapted for the rigid holding of a plurality of cutting tools and surmounted by a pair of relatively rotatable, electrically non-conductive sleeves arranged one within the other about a common axis of rotation which is normal to said base, and sleeve retaining means, one of said sleeves having connections and passages for the receipt and passage of respective flows of water, gas and electricity and the other of said sleeves having means for receiving said flows from said one sleeve and re-directing them to positions adjacent a respective one of the cutting tools positions on said rotatable base at each of which adjacent positions in operation, there will be a plasma gun.

2. A turret as claimed in claim 1 wherein said one sleeve is the inner sleeve and is flanged adjacent that end remote from said rotatable base and the flange overlaps that end of the outer sleeve of said pair of rotatable sleeves adjacent thereto and entraps it against said rotatable base member so as to prevent relative rotation between the sleeves.

3. A turret as claimed in claim 2 wherein said pair of relatively rotatable sleeves are relatively movable axially of each other so as to permit said trapping and releasing of said outer sleeve between the flange of the inner sleeve and rotatable base.

4. A turret as claimed in claim 2 wherein the inner sleeve has a common connection for the receipt of water and electricity flows mounted on its flange and the outer sleeve has a common water and electricity flow receiving and re-directing means.

5. A turret as claimed in claim 4 wherein the electrical flow receipt and re-direction connections are electrically connected together in parallel with the water flow passage through said one sleeve.

6. A turret as claimed in claim 2 wherein the inner sleeve has one gas connection and a common water and electricity receipt connection and one water return connection on its flange and the outer sleeve has one gas connection and a common water and electricity re-direction means for each one of a plurality of plasma guns which in operation will be mounted on said rotatable base.

7. A turret as claimed in claim 1 wherein the gas, water and electricity connections for both receipt and re-direction thereof are sealed against leakage of their respective flows.

8. A turret as claimed in claim 7 wherein the common water and electrical connecting points are encased in a mouldable plastic which is electrically non-conductive.

9. A turret as claimed in claim 1 wherein the sleeve retaining means comprises an end cap connected to the rotatable base via a spindle which passes through said sleeves in coaxial relationship therewith, said spindle being screw threadedly connected to said base so that rotation of said cap in one direction causes cap and spindle to move axially of said sleeves and so traps the inner sleeve between cap and base and rotation of said cap in a reverse direction releases said sleeve for rotation relative to the outer sleeve.

* * * * *